US 9,806,646 B2

(12) United States Patent
Akimatsu et al.

(10) Patent No.: US 9,806,646 B2
(45) Date of Patent: Oct. 31, 2017

(54) CONTROL APPARATUS OF MOTOR

(71) Applicant: DENSO CORPORATION, Kariya, Aichi-pref. (JP)

(72) Inventors: Ryunosuke Akimatsu, Kariya (JP); Tatsuya Tonari, Kariya (JP); Toshihiro Uchida, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/346,033

(22) Filed: Nov. 8, 2016

(65) Prior Publication Data

US 2017/0133961 A1 May 11, 2017

(30) Foreign Application Priority Data

Nov. 10, 2015 (JP) ................................. 2015-220544

(51) Int. Cl.
*H02P 6/10* (2006.01)
*H02P 29/60* (2016.01)

(52) U.S. Cl.
CPC ............... *H02P 6/10* (2013.01); *H02P 29/60* (2016.02)

(58) Field of Classification Search
CPC .. H02P 6/10; H02P 27/08; H02P 29/50; H02P 21/06; H02P 2209/07; H02P 23/0004; H02P 6/06; H02P 6/14; H02P 6/16
USPC ............... 318/400.23, 400.07, 400.17, 400.2
See application file for complete search history.

(56) References Cited

U.S. PATENT DOCUMENTS

| 6,053,047 | A | * | 4/2000 | Dister | G01M 13/028 73/593 |
|---|---|---|---|---|---|
| 6,289,735 | B1 | * | 9/2001 | Dister | G01H 1/003 73/579 |
| 6,404,152 | B1 | | 6/2002 | Kobayashi et al. | |
| 7,787,267 | B2 | * | 8/2010 | Wu | H02J 3/1842 307/105 |
| 7,952,308 | B2 | * | 5/2011 | Schulz | H02P 6/10 318/400.07 |
| 2003/0130810 | A1 | * | 7/2003 | Smulders | G01H 1/003 702/56 |
| 2008/0219035 | A1 | * | 9/2008 | Wu | H02J 3/1842 363/41 |
| 2009/0251096 | A1 | * | 10/2009 | Schulz | H02P 6/10 318/801 |
| 2015/0145451 | A1 | * | 5/2015 | Semura | H02P 6/10 318/400.23 |
| 2015/0365025 | A1 | * | 12/2015 | Semura | H02P 6/10 318/400.2 |

(Continued)

FOREIGN PATENT DOCUMENTS

JP        2007-312520 A        11/2007

*Primary Examiner* — Paul Ip
(74) *Attorney, Agent, or Firm* — Oliff PLC

(57) ABSTRACT

In a control apparatus, a fundamental voltage generator generates, based on a target rotational speed, a fundamental voltage command for a fundamental voltage. A property storage stores a natural vibration property of a rotor when the rotor is rotating as a rotating vibration property. A rotating state detector detects a rotating position and a rotational speed of the rotor as a rotating state of the rotor. A harmonic voltage generator generates, based on the rotating state of the rotor and the rotating vibration property, a harmonic voltage command to be superimposed on the fundamental voltage command generated by the fundamental voltage generator.

8 Claims, 9 Drawing Sheets

(56) References Cited

U.S. PATENT DOCUMENTS

2016/0344314 A1* 11/2016 Akimatsu ............... H02P 29/50
2017/0222583 A1*  8/2017 Akimatsu ................ H02P 6/16
                                              318/400.17

* cited by examiner

CONTROL APPARATUS OF MOTOR

CROSS REFERENCE TO RELATED APPLICATIONS

This application is based on and claims the benefit of priority from Japanese Patent Application 2015-220544 filed on Nov. 10, 2015, the disclosure of which is incorporated in its entirety herein by reference.

TECHNICAL FIELD

The present disclosure relates to motor control apparatuses that superimpose a harmonic voltage on a fundamental voltage applied to a stator coil of a motor to reduce motor noise accordingly.

BACKGROUND

An example of conventional motor control apparatuses is disclosed in Japanese Patent Application Publication No. 2015-128368. The conventional control apparatus for a motor, which includes a stator and a rotor, superimposes a harmonic current on a fundamental current and causes the superimposed current to flow through the stator coil of the stator. This reduces electromagnetic variations acting on the rotor, thus reducing noise generated by the motor.

SUMMARY

Unfortunately, the conventional control apparatus set forth above may not sufficiently reduce motor noise.

The inventors of the present application eagerly consider this issue, and determine that this issue will be due to variations of the natural vibration property of the rotor with rotation of the rotor. Rotation of the rotor may cause centrifugal force to deform the rotor. This may result in change of the rigidity of the rotor. This change of the rigidity of the rotor results in variations of the natural vibration property of the rotor.

That is, the inventors determine that superimposing a harmonic voltage on a fundamental voltage based on the first natural vibration property of the rotor being at rest although the first natural vibration property of the rotor differ from the second natural vibration property of the rotor being rotating may cause insufficient reduction of motor noise.

In view of the circumstances set forth above, one aspect of the present disclosure seeks to provide control apparatuses of a motor, each of which is capable of addressing the problem set forth above.

Specifically, an alternative aspect of the present disclosure aims to provide such control apparatuses, each of which is capable of reliably reducing motor noise.

According to an exemplary aspect of the present disclosure, there is provided a control apparatus for a motor including a stator with a stator coil, and a rotor including a rotor magnetic field. An AC voltage based on a target rotational speed is input to the stator coil as a fundamental voltage, so that magnetic interactions between a stator magnetic field generated by the stator coil and the rotor magnetic field rotate the rotor. The control apparatus includes a fundamental voltage generator configured to generate, based on the target rotational speed, a fundamental voltage command for the fundamental voltage. The control apparatus includes a property storage configured to store a natural vibration property of the rotor when the rotor is rotating as a rotating vibration property. The control apparatus includes a rotating state detector configured to detect a rotating position and a rotational speed of the rotor as a rotating state of the rotor. The control apparatus includes a harmonic voltage generator configured to generate, based on the rotating state of the rotor and the rotating vibration property, a harmonic voltage command to be superimposed on the fundamental voltage command generated by the fundamental voltage generator.

The harmonic voltage generator generates the harmonic voltage command using the rotating vibration property that represents the natural vibration property of the rotor while the rotor is rotating. This configuration enables the harmonic voltage command generated by the harmonic voltage generator to reflect the natural vibration property of the rotor while the rotor is rotating.

This therefore reliably reduces motor noise caused by vibrations of the rotating rotor.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
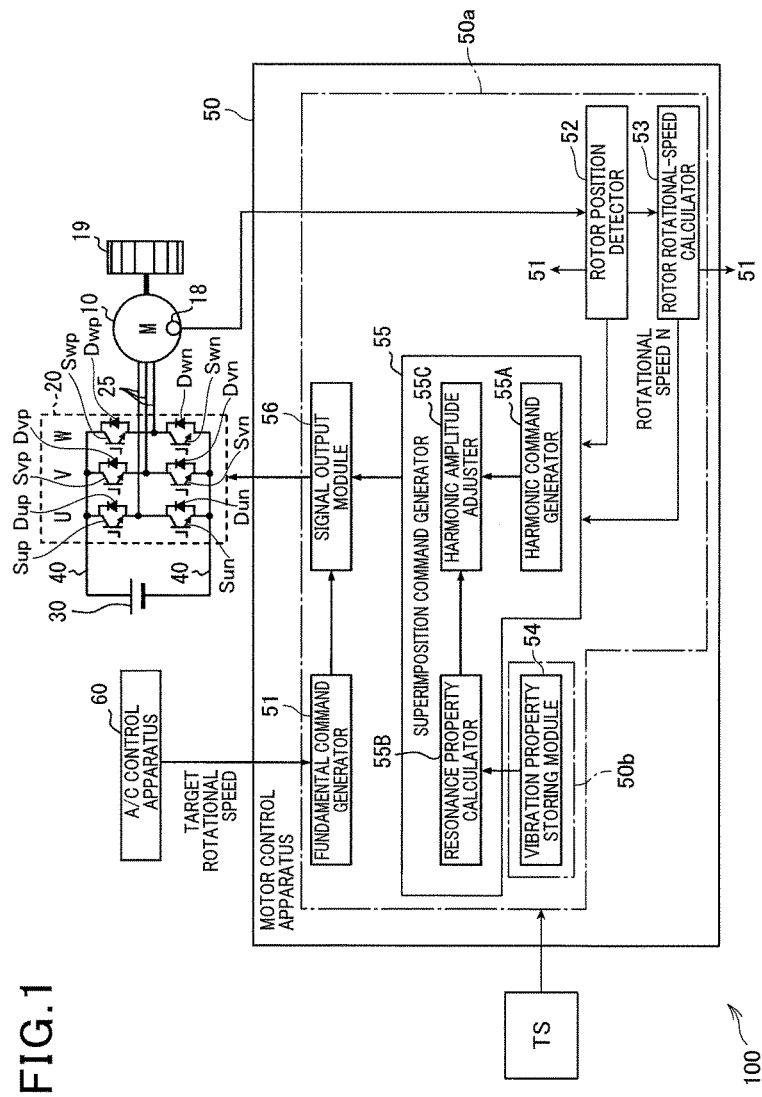
FIG. 1 is a circuit and block diagram of a motor control system including a motor control apparatus according to the first embodiment of the present disclosure.

The following describes embodiments of the present disclosure with reference to the accompanying drawings. In the embodiments, like parts between the embodiments, to which like reference characters are assigned, are omitted or simplified to avoid redundant description.

Referring to FIG. 1, a motor control system 100 includes a motor control apparatus, referred to as a control apparatus, 50, a DC power source 30, an inverter 20, and a motor 10. The control apparatus 50 aims to control how to drive a motor 10 for a fan 19 of an air conditioner installed in a vehicle. The motor 10 rotatably drives the fan 19 as an electrical load. The fan 19 is a centrifugal fan provided in an air duct installed in the vehicle interior. The fan 19 produces the flow of blown-out air in the air duct. A sirocco fan housed in a scroll casing can be used as the fan 19. A turbo fan can also be used as the fan 19.

An air-conditioner (A/C) control apparatus 60, which is higher in hierarchy than the control apparatus 50, is provided to control the air conditioner. The A/C control apparatus 60 sends a target rotational speed for the fan 19, i.e. the motor 10, to the control apparatus 50.

The first embodiment of the present disclosure uses a permanent magnet synchronous motor as the motor 10. The motor 10 is mounted to the air duct of the air conditioner. The motor 10 includes a rotor having permanent magnets, and a stator having a stator core and stator coils. In particular, the motor 10 is designed as a three-phase permanent magnet synchronous motor, which is capable of rotating the rotor having the permanent magnets based on magnetic interactions between the permanent magnets of the rotor and a rotating magnetic field generated by U-, V-, and W-phase stator coils of the stator. The stator can be configured such that each of the three-phase stator coils is wound in the stator core in concentrated or distributed configuration.

Figure 2:
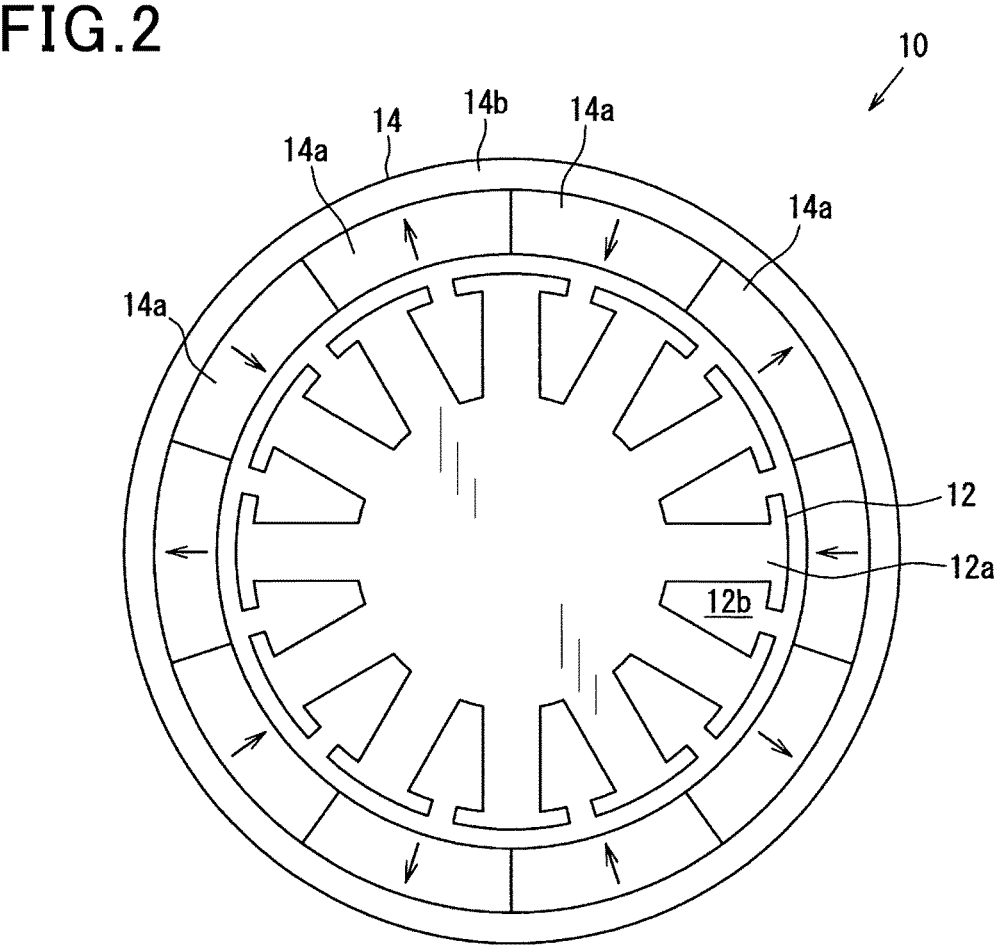
FIG. 2 is a cross sectional view taken on a plane perpendicular to the axial direction of a motor illustrated in FIG. 1.

Specifically, as illustrated in FIG. 2, the first embodiment uses an outer-rotor motor 10. FIG. 2 is a cross sectional view taken on a plane perpendicular to the axial direction of the motor 10. In FIG. 2, hatching is omitted in order to clearly illustrate the cross section of the motor 10.

The motor 10 illustrated in FIG. 2 includes a single stator 12 and a rotor 14 arranged to be rotatable with respect to the stator 12. The rotor 14 has a hollow cylindrical shape, i.e. an annular shape. The rotor 14 is arranged to surround the stator 12 with an air gap between the inner periphery of the rotor 14 and the outer periphery of each of the teeth of the stator 12 described later. In other words, the stator 12 is disposed in the hollow portion of the rotor 14.

The rotor 14 is comprised of a plurality of permanent magnets 14a, and a back yoke 14b, which is made of a soft magnetic material. The back yoke 14b is arranged at a radially outer side of each permanent magnet 14a, and joins the permanent magnets 14a such that the joined permanent magnets 14a have an annular shape.

For example, the rotor 14 according to the first embodiment includes ten permanent magnets 14a having the same shape. Each of the permanent magnets 14a serves as a magnetic pole. That is, each of the permanent magnets 14a has a magnetic pole extending radially outward. The polarities of the permanent magnets 14a arranged in the circumferential direction of the rotor 14 alternately change. Specifically, N- and S-pole permanent magnets 14a are alternately arranged in the circumferential direction of the rotor 14. Referring to FIG. 2, the arrow described in a permanent magnet 14a and oriented outward represents an N pole, and the arrow described in another permanent magnet 14a and oriented inward represents an S pole.

The stator 12 is comprised of a cylindrical stator core and a plurality of, for example, twelve teeth 12a each continuously projecting radially outward from the outer periphery of the stator core. The teeth 12a are arranged in the circumferential direction of the stator core at regular pitches via slots 12b. That is, each of the teeth 12a faces the inner periphery of the rotor 14 with an air gap therebetween.

As described above, the first embodiment uses the motor 10 having five pole-pairs and twelve slots.

Referring to FIG. 1, the DC power source 30 is comprised of, for example, a battery for outputting a DC voltage. The DC power source 30 is connected to the inverter 20 via a pair of buses 40, and supplies a DC voltage to the inverter 20 via the pair of buses 40.

The inverter 20 includes a U-phase arm, a V-phase arm, and a W-phase arm. The inverter 20 is operative to perform pulse width modulation (PWM) that converts the DC voltage input from the DC power source 30 into three-phase AC voltages.

The U-phase arm includes an upper arm and a lower arm connected in series to each other. The upper arm is comprised of a switching element Sup and a diode Dup connected in antiparallel to the switching element Sup, and the lower arm is comprised of a switching element Sun and a diode Dun connected in antiparallel to the switching element Sun.

The V-phase arm includes an upper arm and a lower arm connected in series to each other. The upper arm is comprised of a switching element Svp and a flywheel diode Dvp connected in antiparallel to the switching element Svp, and the lower arm is comprised of a switching element Svn and a flywheel diode Dvn connected in antiparallel to the switching element Svn.

The W-phase arm includes an upper arm and a lower arm connected in series to each other. The upper arm is comprised of a switching element Swp and a flywheel diode Dwp connected in antiparallel to the switching element Swp, and the lower arm is comprised of a switching element Swn and a diode Dwn connected in antiparallel to the switching element Swn.

The connection point between the upper- and lower arms of the U-phase arm is connected to a first end of the U-phase coil via a connection line 25, and the connection point between the upper- and lower arms of the V-phase arm is connected to a first end of the V-phase coil via a connection line 25. Similarly, the connection point between the upper- and lower arms of the W-phase arm is connected to a first end of the W-phase coil via a connection line. Second ends of the U-, V-, and W-phase stator coils, which are opposite to the first ends, are connected to a common junction, i.e. a neutral point, in, for example, a star-configuration.

In the first embodiment, as the switching elements S*# (*=u, v, and w, and #=p and n), insulated gate bipolar transistors (IGBTs) are respectively used. When power MOSFETs are used as the switching elements S*#, intrinsic diodes of the power MOSFETs can be used as the flywheel diodes, thus eliminating the need for external flywheel diodes.

A reverse conducting insulated gate bipolar transistor (RCIGBT), which is comprised of an IGBT and a flywheel diode connected in antiparallel thereto, and the IGBT and the flywheel diode are integrated to a single chip, can be used as each of the switching elements S*#.

A first end of the U-phase arm is connected to the positive-side bus 40 connected to the positive terminal of the DC power source 30, and a second end thereof, which is opposite to the first end, is connected to the negative-side bus 40 connected to the negative terminal of the DC power source 30.

Similarly, a first end of the V-phase arm is connected to the positive-side bus 40 connected to the positive terminal of the DC power source 30, and a second end thereof, which is opposite to the first end, is connected to the negative-side bus 40 connected to the negative terminal of the DC power source 30. Additionally, a first end of the W-phase arm is connected to the positive-side bus 40 connected to the positive terminal of the DC power source 30, and a second end thereof, which is opposite to the first end, is connected to the negative-side bus 40 connected to the negative terminal of the DC power source 30.

Each of the switching elements S*# has a control terminal, such as its gate. The control terminal of each of the switching elements S*# is connected to the control terminal 50.

The motor control system 100 includes a rotational position sensor 18 provided in the motor 10 for measuring the rotational position of the rotor 14. For example, the rotational position sensor 18 is operative to measure the rotational position of the rotor 14 relative to the stator 12. The first embodiment can use a Hall element, an encoder, or a resolver as the rotational position sensor 18.

The control apparatus 50 controls on-off operations of the switching elements S*# of the inverter 20 to control how to drive the motor 10 accordingly. The control apparatus 50 is connected to the rotational position sensor 18, and obtains a signal indicative of the rotational position of the rotor 14 as a measurement signal, and other pieces of information indicative of, for example, three-phase currents flowing in the motor 10 and an input voltage to the inverter 20. Then, the control apparatus 50 generates, based on the rotor position signal and the other pieces of information, switching signals each representing on-off patterns of a corresponding one of the switching elements S*#. Thereafter, the control apparatus 50 individually sends the switching signals to the respective switching elements S*#, thus controlling on-off operations of each of the switching elements S*#. Note that the switching signals for the upper- and lower-arm switching elements of each phase are determined to complementarily turn on the upper- and lower-arm switching elements of the corresponding phase.

The on-off operations of the switching elements S*# of the inverter 20 convert the DC voltage output from the DC power source 30 into controlled three-phase AC voltages. The controlled three-phase AC voltages are applied to the respective three-phase coils, so that a rotating magnetic field induced in the stator 12. Magnetic mutual actions between the rotating magnetic field of the stator 12 and the permanent magnets 14a of the rotor 14 cause the rotor 14 to rotate relative to the stator 12.

The control apparatus 50 is designed as, for example, a microcomputer circuit, which includes essentially, for example, a CPU 50a and a memory 50b equipped with a ROM and a RAM, and its peripheral circuit.

Referring to FIG. 1, the control apparatus 50 includes a fundamental command generator 51, a rotor position detector 52, a rotor rotational-speed calculator 53, a vibration property storing module 54, a superimposition command generator 55, and a signal output module 56.

For example, the CPU 50a runs programs stored in the memory 50b to implement the other modules 51 to 56. At least one hardware module, which serves as at least one of the modules 51 to 56, can be installed in the control apparatus 50.

The rotor position detector 52 receives the measurement signal sent from the rotational position sensor 18, and detects the rotational position of the rotor 14 based on the measurement signals sent from the rotor position sensor 52. The rotor position detector 52 sends a rotor position signal indicative of an actual rotor position to the fundamental command generator 51, the rotor rotational-speed calculator 53, and the superimposition command generator 55 each time the rotor position detector 52 detects the rotational position of the rotor 14 as an actual rotor position.

The rotor rotational-speed calculator 53 calculates an actual rotational speed N [rpm] of the rotor 14 based on the rotor position signal sent from the rotor position detector 52. The rotor rotational-speed calculator 53 sends a rotor rotational-speed signal indicative of the actual rotational speed N of the rotor 14 to the superimposition command generator 55.

The rotor position detector 52 and the rotor rotational-speed calculator 53 serve as, for example, a rotational state detector for detecting a rotational position and a rotational speed of a rotor according to the present disclosure.

The fundamental command generator 51 receives the target rotational speed sent from the A/C control apparatus 60, and recognizes that the received target rotational speed as a target rotational speed of the motor 10. The fundamental command generator 51 generates, based on the target rotational speed, the rotor position signal, and the rotor rotational-speed signal, fundamental AC voltage commands, i.e. fundamental sinusoidal AC voltage commands, to be applied to the respective phase stator coils of the stator 12.

Specifically, the fundamental command generator 51 performs a proportional-integral (PI) feedback control algorithm (PI algorithm) based on the rotational state, i.e. the rotational position and the rotational speed of the rotor 14, fed back from the motor 10, thus generating the fundamental AC voltage commands requited to rotate the rotor 14 at the target rotational speed.

More specifically, the fundamental command generator 51 generates information indicative of an AC voltage waveform that should be applied to each of the three-phase stator coils for turning the rotor 14 at the target rotational speed. Then, the fundamental command generator 51 outputs the information, referred to as AC-voltage waveform information, for each of the three-phase stator coils to the signal output module 56. The AC-voltage waveform information for each of the three-phase stator coils includes the frequency, the amplitude, and phase of a fundamental AC voltage to be applied to the corresponding one of the three-phase stator coils. That is, the fundamental command generator 51 serves as, for example, a fundamental voltage generator for generating a fundamental AC voltage command according to the present disclosure.

The vibration property storing module 54 is comprised of a function of the CPU 50a and the memory 50b of the motor controller 50. That is, the vibration property storing module 54, i.e. the memory 50b, stores information indicative of a natural vibration property of the rotor 14 while the rotor 14 is rotating; the natural vibration property will be referred to as a rotating vibration property. The vibration property of the rotor 14 being rotating is previously obtained based on computer-aided engineering (CAE). Natural frequency analysis, which is also known as eigenvalue analysis, of the rotor 14 based on CAE provides the natural vibration property of the rotor 14 while the rotor 14 is turning so as to be stressed. The natural frequency analysis based on CAE obtains the natural vibration property of the rotor 14 in, for example, a ring secondary mode that is likely to induce resonance. Note that the ring secondary mode represents a vibration deformation mode in which opposing two portions, 7C radian apart from each other, of a ring shaped object radially expand and contract.

Figure 3:
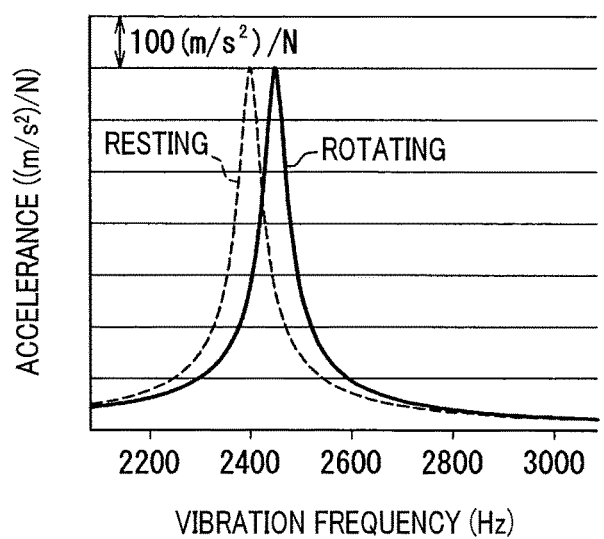
FIG. 3 is a graph schematically illustrating a rotating vibration property of a rotor of the motor while the rotor is rotating and a resting vibration property of the rotor while the rotor is at rest according to the first embodiment.

The rotating vibration property of the rotor 14 are stored in the ROM of the memory 50b of the control apparatus 50 as, for example, an accelerance frequency property of the rotor 14, which is illustrated by the solid curve in FIG. 3, with respect to the vibration frequency of the rotor 14. Note that the term "accelerance" means the ratio of acceleration of the rotor 14 to force applied to the rotor 14, which has a unit of $(m/s^2)/N$.

Referring to FIG. 3, the rotating vibration property of the rotor 14 illustrated by the solid curve differs from the vibration property of the rotor 14 while the rotor 14 is at rest, which is illustrated by the dashed curve in FIG. 3. The rotor 14 is slightly distorted due to centrifugal force when being rotating. This distortion of the rotor 14 causes the rigidity of the rotor 14 in a rotating state to differ from the rigidity of the rotor 14 in a resting state. This change in rigidity between the rotating rotor 14 and the resting rotor 14 may change in natural vibration property between the rotating rotor 14 and the resting rotor 14.

The inventors of the present disclosure have analyzed the rotating vibration property and the resting vibration property of the rotor 14, and have determined that the rotating vibration property differs from the resting vibration property.

In particular, the rotor 14 according to the first embodiment is configured such that each of the permanent magnets 14a of the rotor 14 is symmetrically located with respect to the opposing one of the permanent magnets 14a across the axial direction of the rotor 14 (see FIG. 2). When the rotor 14 has the configuration illustrated in FIG. 2, the inventors have shown that the rotating vibration property of the rotor 14 changes with respect to the resting vibration property of the rotor 14. That is, the accelerance peak of the rotating vibration property is shifted to the higher frequency side relative to the accelerance peak of the resting vibration property.

Specifically, the vibration property storing module 54 stores information indicative of the rotating vibration property of the rotor 14 illustrated by the solid curve in FIG. 3. For example, the vibration property storing module 54 stores, as the information indicative of the rotating vibration property of the rotor 14, the set of the resting vibration property illustrated by the dashed curve in FIG. 3 and a correction function formula that corrects the resting vibration property to the rotating vibration property illustrated by the solid curve in FIG. 3. In other words, the rotating vibration property of the rotor 14 is represented as a function of the resting vibration property of the rotor 14.

Note that a plurality of resting vibration properties, which differ from each other in temperature variations of the motor 10 and/or load variations of the motor 10, can be stored in the memory 50b. In this example, correcting a selected one of the plurality of resting vibration properties by the correction function formula generates the rotating vibration property matching with the present temperature of the motor 10 and the present load state for the motor 10.

For example, the correction function formula includes a first correction term for correcting at least one resting vibration property to the rotating vibration property. The correction function formula can include, in addition to the first correction term, a second correction term for absorbing the variations of the at least one resting vibration property due to temperature variations, and a third term for absorbing the variations of the at least one resting vibration property due to load-state variations. This enables the number of resting vibration properties, which differ from each other in temperature variations and/or load variations, to be reduced.

That is, the vibration property storing module 54 stores the pair of at least one resting vibration property of the rotor and the corresponding correction function formula as the info' illation indicative of the rotating vibration property of the rotor 14. The present disclosure is however not limited to the configuration.

Specifically, the vibration property storing module 54 can store a plurality of rotating vibration properties each depending on a corresponding temperature of the motor 10 and a corresponding load state connected to the motor 10 as map data.

When the present temperature of the motor 10 is input from a temperature sensor TS to the vibration property storing module 54, the vibration property storing module 54 receives the present temperature of the motor 10. In addition, the vibration property storing module 54 calculates the present operating state of the load 19 based on the rotational speed N of the rotor 14 and the fundamental AC voltage commands for the respective phase stator coils.

Then, the vibration property storing module 54 generates a rotating vibration property matching with the present temperature of the motor 10 and the present operating state of the load 19 based on the at least one resting vibration property and the correction function formula. Otherwise the vibration property storing module 54 extracts, from the map data, a rotating vibration property matching with the present temperature of the motor 10 and the present operating state of the load 19.

Then, the vibration property storing module 54 outputs the rotating vibration property to the superimposition command generator 55.

The superimposition command generator 55, which serves as, for example, a harmonic voltage generator, includes a harmonic command generator 55A, a resonance property calculator 55B, and a harmonic amplitude adjuster 55C. The harmonic command generator 55A and the harmonic amplitude adjuster 55C serve as, for example, a harmonic command determiner, and the harmonic amplitude adjuster 55C also serves as, for example, an amplitude determiner.

The superimposition command generator 55 receives the rotating vibration property sent from the vibration property storing module 54, the rotor position signal sent from the rotor position detector 52, and the rotor rotational-speed signal sent from the rotor rotational-speed calculator 53. Then, the superimposition command generator 55 generates, for the respective phase stator coils of the stator 12, harmonic AC voltage commands in accordance with the received rotating vibration property, rotor position signal, and rotor rotational-speed signal; the harmonic AC voltage commands are used to be superimposed on the fundamental AC voltage commands for the respective phase stator coils.

The harmonic command generator 55A determines a value of the frequency and a value of the phase of each of the harmonic AC voltage commands to be superimposed on the respective fundamental AC voltage commands in accordance with the rotor position signal and rotor rotational-speed signal.

The resonance property calculator 55B multiplies, by a predetermined rotation order, the actual rotational speed N of the rotor 14 obtained by the rotor rotational-speed calculator 53 to calculate the product of the predetermined rotation order and actual rotational speed N.

Note that the rotation order for the rotor 14, i.e. the motor 10, is described using an example. The first rotation order of a rotating object represents a frequency of a rotating object per second. For example, the first rotation order of a rotating object at 1200 rpm is 20 Hz. That is, the rotation of the rotating object at 20 Hz represents the first rotation order of the rotating object. The rotation of the rotating object at 60 Hz therefore represents the third rotation order of the rotating object.

Then, the resonance property calculator 55B converts the rotating vibration property of the rotor 14 based on the vibration frequency of the rotor 14 into an accelerance vibration property of the rotor 14 based on the predetermined rotation order in accordance with the product of the predetermined rotation order and actual rotational speed N.

Thereafter, the resonance property calculator 55B calculates a resonance characteristic value at a resonance rotational speed in the accelerance vibration property of the rotor 14 at the predetermined rotation order. That is, the resonance characteristic value of the rotor 14 represents the accelerance of the rotor 14. Then, the resonance property calculator 55B outputs, to the harmonic amplitude adjuster 55C, the accelerance vibration property and the resonance characteristic value of the rotor 14 at the predetermined rotation order.

The harmonic amplitude adjuster 55C determines a value of the amplitude of each of the harmonic AC voltage commands to be superimposed on the respective fundamental AC voltage commands in accordance with the resonance characteristic value, the rotor position signal, and the rotor rotational-speed signal.

Specifically, the harmonic amplitude adjuster 55C determines, based on the resonance characteristic value of the rotor 14 at the predetermined rotation order, a value of the amplitude of each of the harmonic AC voltage commands. The determined value of the amplitude of each of the harmonic AC voltage commands enables the amplitude of vibrations of the rotor 14 to decrease down to a predetermined level.

The first embodiment determines, based on measurement results of sound pressure of motor noise, that the predetermined rotation order, whose noise level should be reduced, is set to fiftieth-order (50th-order). The fiftieth (50th-order) represents the rotation order of the rotor 14 in mechanical angle. Because the number of pole-pairs of the rotor 14 is five, the rotation order of the rotor 14 in electrical angle is set to tenth-order.

The inventors of the present disclosure has confirmed that superimposing $(6n\pm1)$th-order harmonic AC voltage commands in electrical angle on respective fundamental AC voltage commands enables $(6n\pm2)$th-order vibrations in electrical angle to be efficiently reduced. Note that n represents a natural value, and is set to 2 in the first embodiment. That is, superimposing 11th-order harmonic AC voltage commands in electrical angle on respective fundamental AC voltage commands enables 10th-order vibrations in electrical angle to be efficiently reduced. In other words, superimposing 55th-order harmonic AC voltage commands in mechanical angle on respective fundamental AC voltage commands enables 50th-order vibrations in mechanical angle to be efficiently reduced.

In view of the above features, the harmonic command generator 55A determines, as the frequency of each of the harmonic AC voltage commands, the 55th-order frequency in mechanical angle. In addition, the resonance property calculator 55B multiplies, by 50 as the predetermined rotation order, the actual rotational speed N of the rotor 14 to calculate the product of 50th rotation order and actual rotational speed N.

Then, the resonance property calculator 55B converts the rotating vibration property of the rotor 14 based on the vibration frequency of the rotor 14 into an accelerance vibration property of the rotor 14 based on the 50th rotation order.

As described above, the vibration property storing module 54 stores the accelerance frequency property, which is illustrated by the solid curve in FIG. 3, with respect to the vibration frequency of the rotor 14 as the rotating vibration property of the rotor 14.

Figure 4:
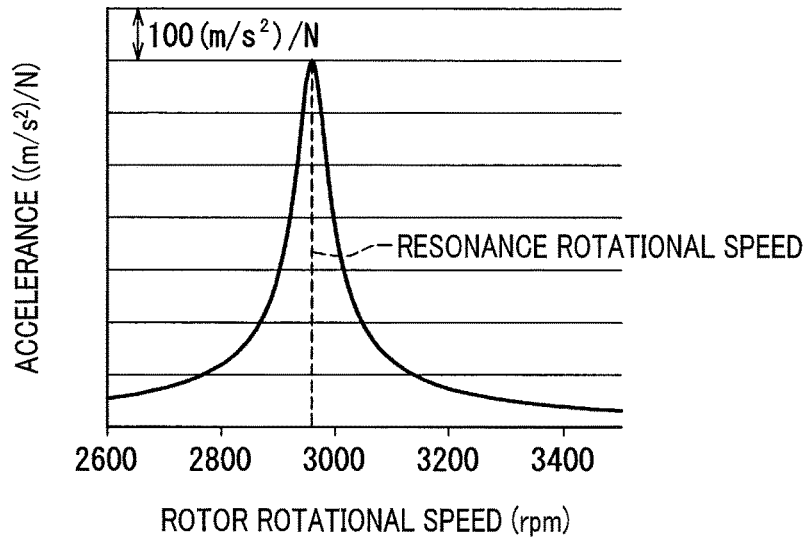
FIG. 4 is graph schematically illustrating an accelerance vibration property of the rotor based on a rotational speed of the rotor according to the first embodiment.

The resonance property calculator 55B converts the rotating vibration property illustrated by the solid curve in FIG. 3, into an accelerance vibration property, i.e. the second rotating vibration property, based on the predetermined rotation order of 50 as illustrated in FIG. 4.

Specifically, dividing the product of the vibration frequency (Hz) illustrated in FIG. 3 and 60 by the predetermined rotation order of 50 calculates a value of the rotational speed (rpm) at the predetermined rotation order of 50. For example, dividing the product of 2400 (Hz) and 60 by 50 calculates 2880 (rpm).

As illustrated in FIG. 4, a value of the rotational speed, at which the accelerance vibration property has a peak, represents a resonance rotational speed (rpm) of the rotor 14 at the predetermined rotation order of 50.

Note that the vertical axis of the accelerance vibration property, i.e. the second rotating vibration property, of the rotor 14 based on the rotational speed (rpm) of the rotor 14 illustrated in FIG. 4 have units each corresponding to 1 $(m/s^2)/N$.

Then, the resonance property calculator 55B outputs, to the harmonic amplitude adjuster 55C, the accelerance vibration property and the accelerance peak at the resonance rotational speed; the peak acceleration represents a resonance characteristic value in the accelerance vibration property based on the predetermined rotation order of 50.

The harmonic amplitude adjuster 55C determines, based on the resonance characteristic value at the predetermined rotation order of 50, a reduction amount of the vibration amplitude of the rotor 14. Then, the harmonic amplitude adjuster 55C determines a value of the amplitude of each of the harmonic AC voltage commands to be superimposed on the respective fundamental AC voltage commands.

Specifically, the harmonic amplitude adjuster 55C converts the accelerance vibration property, i.e. the second rotating vibration property, of the rotor 14 based on the rotational speed (rpm) of the rotor 14 into an accelerance vibration property of the rotor 14 in dB whose vertical axis have units each corresponding to 5 dB.

Then, the harmonic amplitude adjuster 55C determines, based on the acceleration vibration property of the rotor 14 in dB, a target reduction dB lower than the resonance characteristic value, i.e. the accelerance peak, in dB. Based on the target reduction dB, the harmonic amplitude adjuster 55C determines a superimposition rotational-speed range within which the harmonic AC voltage commands are superimposed on the respective fundamental AC voltage commands.

In addition, the harmonic amplitude adjuster 55C determines, based on the target reduction dB, the amplitude, i.e. maximum amplitude, of a reference harmonic AC voltage command.

Figure 5:
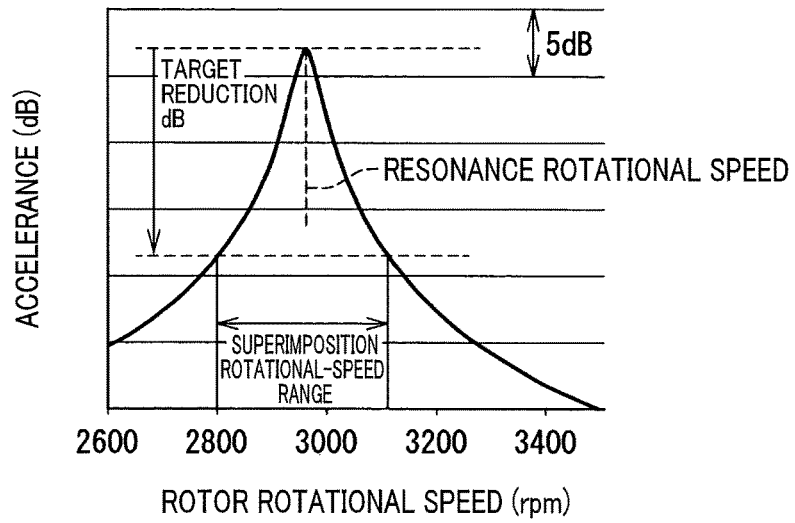
FIG. 5 is a graph schematically illustrating an accelerance vibration property of the rotor in dB according to the first embodiment.
Figure 6:
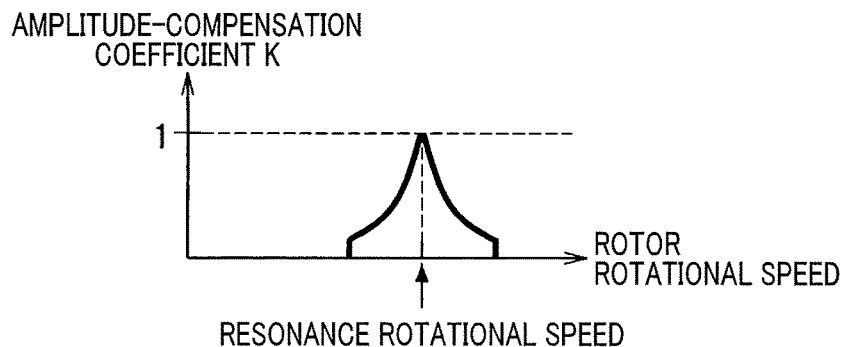
FIG. 6 is a graph schematically illustrating an amplitude-compensation coefficient property according to the first embodiment.

Next, the harmonic amplitude adjuster 55C determines, based on the change of the accelerance vibration property relative to the accelerance peak illustrated in FIG. 5, a property of an amplitude-compensation coefficient K that is used to be multiplied to the amplitude of the reference harmonic AC voltage command as illustrated in FIG. 6.

That is, the harmonic amplitude adjuster 55C determines the amplitude compensation coefficient K within the superimposition rotational-speed range such that (1) A value of the amplitude compensation coefficient K is set to 1 when the actual rotational speed of the rotor 14 is in agreement with the resonance rotational speed (2) The amplitude compensation coefficient K gradually decreases in conformance with the decrease of the accelerance vibration property from the accelerance peak (see FIG. 5) as the actual rotational speed of the rotor 14 deviates from the resonance rotational speed.

That is, the harmonic amplitude adjuster 55C gradually reduces the amplitude of the reference harmonic AC voltage command within the superimposition rotational-speed range as the actual rotational speed of the rotor 14 deviates from the resonance rotational speed. How the amplitude of the reference harmonic AC voltage command gradually drops is determined to reflect the change of the vibration amplitude of the rotor 14 due to variations of the rotational speed of the rotor 14 without using harmonic AC voltage commands.

In other words, how the amplitude of the reference harmonic AC voltage command gradually drops is determined to reflect the change of the acceleration of the rotor 14 (see FIG. 5) due to variations of the rotational speed of the rotor 14 without using harmonic AC voltage commands.

The above descriptions with reference to FIGS. 3 to 6 provide an example of the present disclosure, so that the present disclosure is not limited to the descriptions.

Specifically, the rotating vibration property of the rotor 14 stored by the vibration property storing module 54 is not limited to the rotating vibration property illustrated in FIG. 3. For example, the vibration property storing module 54 can store the accelerance vibration property, i.e. the second rotating vibration property, based on the rotational speed (rpm) of the rotor 14 illustrated in FIG. 4.

The harmonic amplitude adjuster 55C cannot convert the accelerance vibration property of the rotor 14 based on the rotational speed (rpm) of the rotor 14 into an accelerance vibration property of the rotor 14 in dB, but the present disclosure is not limited thereto. Specifically, the harmonic amplitude adjuster 55C can be configure to determine the amplitude compensation coefficient K directly from the accelerance vibration property, i.e. the second rotating vibration property, of the rotor 14 illustrated in FIG. 4.

The resonance property calculator 55B can include the accelerance vibration property, an example of which is illustrated in FIG. 5, and can output, to the harmonic amplitude adjuster 55C, the accelerance peak at the resonance rotational speed.

The superimposition command generator 55 outputs each of the harmonic AC voltage commands to the signal output module 56 as a superimposition voltage-command for each phase of the motor 10; each of the harmonic AC voltage commands is comprised of (1) The amplitude of the reference harmonic AC voltage command determined by the harmonic amplitude adjuster 55C as its amplitude (2) The phase and frequency determined by the harmonic command generator 55A as its phase and frequency.

The signal output module 56 superimposes the harmonic AC voltage commands for the respective phases of the motor 10 on the fundamental AC voltage commands for the same phases of the motor 10, thus generating modulated AC voltage commands to be applied to the respective three-phase stator coils of the motor 10

The signal output module 56 compares the modulated AC voltage command for each of the three-phase stator coils of the motor 10 with a cyclical (periodical) carrier signal, i.e. a cyclically triangular carrier signal.

Then, the signal output module 56 generates, based on the comparison results, PWM pulse signals, i.e. switching signals; each of the PWM pulse signals includes a duty factor, i.e. a duty cycle, for each switching period. The duty factor represents a controllable ratio, i.e. percentage, of an on duration to a total duration of each switching period.

Then, the signal output module 56 outputs the switching signals to the control terminals of the respective switching elements Sup, Sun, Svp, Svn, Swp, and Swn. This enables the DC voltage input to the inverter 20 to be converted into controlled three-phase AC voltages to be applied to the respective phase stator coils of the motor 10.

The following describes advantageous effects achieved by the motor control apparatus 50 and/or the motor control system 100.

The motor control apparatus 50 includes the fundamental command generator 51, rotor position detector 52, rotor rotational-speed calculator 53, vibration property storing module 54, and superimposition command generator 55.

The fundamental command generator 51 generates, based on the target rotational speed, the fundamental AC voltage commands to be applied to the respective phase stator coils of the stator 12.

The vibration property storing module 54 stores information, which represents the natural vibration property of the rotor 14 while the rotor 14 is rotating, as the rotating vibration property.

The rotor position detector 52 and rotor rotational-speed calculator 53, which serve as a rotational state detector, respectively measure the actual rotational position and actual rotational speed of the rotor 14.

The superimposition command generator 55 generates, for the respective phase stator coils of the stator 12, harmonic AC voltage commands in accordance with the received rotating vibration property, rotor position signal, and rotor rotational-speed signal; the harmonic AC voltage commands are to be superimposed on the fundamental AC voltage commands for the respective phase stator coils generated by the fundamental command generator 51.

Specifically, the superimposition command generator 55 generates, for each phase of the motor 10, the harmonic AC voltage command using the rotating vibration property that represents the natural vibration property of the rotor 14 while the rotor 14 is rotating. This configuration enables the harmonic AC voltage command generated for each phase of the motor 10 by the superimposition command generator 55 to reflect the natural vibration property of the rotor 14 while the rotor 14 is rotating.

This therefore reliably reduces motor noise caused by vibrations of the rotating rotor 14.

The motor 10 according to the first embodiment is comprised of the hollow rotor 14. This may cause the rotor 14 to be likely distorted due to centrifugal force when the rotor 14 is rotating.

In view of this phenomenon, the superimposition command generator 55 is configured to generate, for each phase of the motor 10, the harmonic AC voltage command using the rotating vibration property that represents the natural vibration property of the rotor 14 while the rotor 14 is rotating. This configuration therefore reliably reduces motor noise caused by vibrations of the rotating hollow rotor 14.

Additionally, the motor 10 according to the first embodiment is designed as an outer-rotor motor such that the rotor 14 has a hollow cylindrical shape, and the stator 12 disposed in the rotor 14. This may cause the rotor 14 to be likely distorted due to centrifugal force when the rotor 14 is rotating, so that the amplitude of resonance vibrations of the rotor 14 may likely increase when the resonance vibrations of the rotor 14 occur.

In view of the phenomenon, the superimposition command generator 55 is configured to generate, for each phase of the motor 10, the harmonic AC voltage command using the rotating vibration property that represents the natural vibration property of the rotor 14 while the rotor 14 is rotating. This configuration therefore reliably reduces motor noise caused by resonance vibrations of the rotating hollow cylindrical rotor 14 of the outer-rotor motor 10.

The vibration property storing module 54 is configured to store the set of the resting vibration property, which is the vibration property of the rotor 14 when the rotor 14 is in the resting state, and the correction function formula that corrects the resting vibration property to the rotating vibration property of the rotor 14.

This configuration, which obtains the rotating vibration property of the rotor 14 based on the set of the resting vibration property and the correction function formula, enables the rotating vibration property to easily depend on other factors of the rotational speed of the rotor 14, such as the temperature variations and the load variations of the motor 10. That is, this configuration reduces the storage capacity of the vibration property storing module 54, i.e. the memory 50*b*, required to store therein the rotating vibration property of the rotor 14 while reliably reducing motor noise caused by vibrations of the rotating rotor 14 of the outer-rotor motor 10.

In particular, the superimposition command generator 55 includes the harmonic command generator 55A, the resonance property calculator 55B, and the harmonic amplitude adjuster 55C.

The resonance property calculator 55B converts the rotating vibration property of the rotor 14 based on the vibration frequency of the rotor 14 into the accelerance vibration property of the rotor 14 based on the predetermined rotation order in accordance with the product of the predetermined rotation order and actual rotational speed N.

Thereafter, the resonance property calculator 55B calculates a resonance characteristic value at the resonance rotational speed in the accelerance vibration property of the rotor 14 at the predetermined rotation order.

The harmonic command generator 55A and the harmonic amplitude adjuster 55C generates, based on the resonance characteristic value calculated by the resonance property calculator 55B, the rotor position signal, and rotor rotational-speed signal, the amplitude, frequency, and phase of each of the harmonic AC voltage commands.

That is, the resonance property calculator 55B calculates the resonance characteristic value that may cause greater noise at the predetermined rotation order; the resonance characteristic value should therefore be reliably reduced.

Then, the harmonic command generator 55A and the harmonic amplitude adjuster 55C generates, based on the resonance characteristic value calculated by the resonance property calculator 55B, the rotor position signal, and rotor rotational-speed signal, the amplitude, frequency, and phase of each of the harmonic AC voltage commands.

This therefore results in reliable reduction of the motor noise at the predetermined rotation order, which is required to be reduced.

In particular, the resonance property calculator 55B obtains a value of the rotational speed, at which the accelerance vibration property has a peak, as the resonance rotational speed of the rotor 14 at the predetermined rotation order. In other words, when no harmonic AC voltage commands are superimposed on the fundamental AC voltage commands, the accelerance vibration property has a peak, i.e. accelerance peak, at the resonance rotational speed of the rotor 14.

That is, the resonance property calculator 55B reduces the amplitude of each of the harmonic AC voltage commands when the actual rotational speed of the rotor 14 is unequal to the resonance rotational speed to be lower than the amplitude of the corresponding one of the harmonic AC voltage commands when the actual rotational speed of the rotor 14 is equal to the resonance rotational speed.

This configuration enables motor noise generated while the rotor 14 is rotating at the resonance rotational speed to be reliably reduced; the resonance rotational speed may cause noise at the predetermined rotation order to likely increase. When the rotational speed of the rotor 14 changes while being within a predetermined range including the resonance rotational speed, it is possible to reduce the changes of the rotational speed of the rotor 14.

Moreover, the harmonic amplitude adjuster 55C gradually reduces the amplitude of the reference harmonic AC voltage command within the superimposition rotational-speed range as the actual rotational speed of the rotor 14 deviates from the resonance rotational speed.

This configuration reliably reduces variations of noise level when the rotational speed of the rotor 14 varies across the resonance rotational speed.

The harmonic amplitude adjuster 55C reduces the amplitude of each of the harmonic AC voltages such that the reduction of the amplitude reflects the change of the accelerance of the rotor 14; this change of the acceleration of the rotor 14 depends on variations of the rotational speed of the rotor 14 without superimposition of the harmonic AC voltages on the respective fundamental AC voltages.

This configuration enables harmonic AC currents based on the harmonic AC voltages, which are effective in reduction of rotor vibrations, to efficiently flow through the stator coils of the motor 10 when the rotational speed of the rotor 14 varies across the resonance rotational speed. This more reliably reduces variations of motor noise level.

Figure 7:
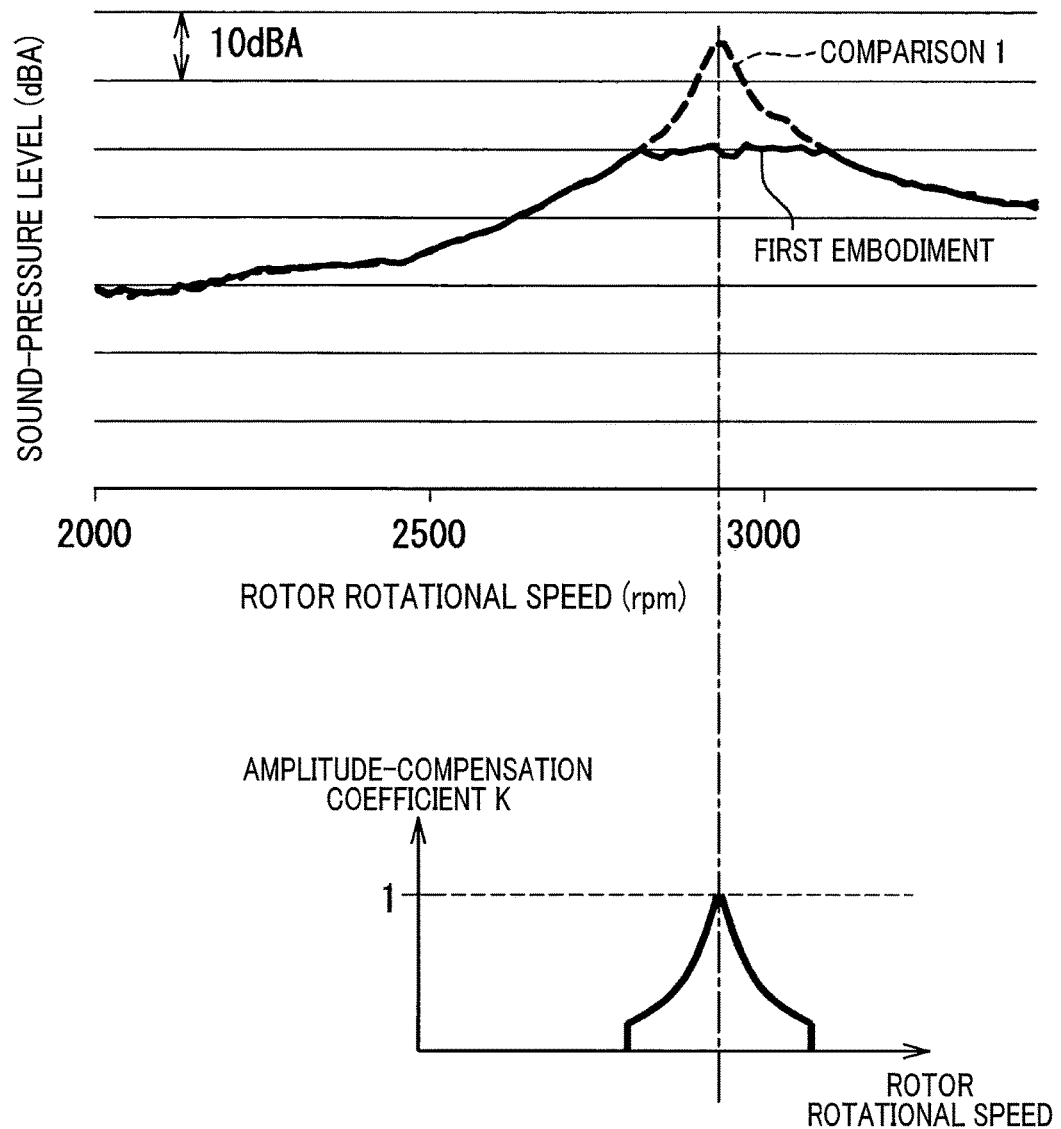
FIG. 7 is graphs schematically illustrating an advantageous effect of noise reduction achieved by the motor control apparatus according to the first embodiment.

The upper side of FIG. 7 schematically illustrates, by the dashed line, a first comparison example (comparison example 1) with respect to the first embodiment. The comparison example 1 shows, as a graph, how the sound-pressure level of noise at the 50th rotation order changes with change of the rotational speed of the rotor 14 without superimposition of harmonic AC voltages on the respective fundamental AC voltages.

As illustrated by the comparison example 1, the graph has a peak sound-pressure level at approximately 2930 rpm of the rotational speed of the rotor 14. The rotational speed of 2930 rpm of the rotational speed of the rotor 14 represents the resonance rotational speed of the rotor 14 at the 50th rotation order.

In contrast, the first embodiment superimposes the harmonic AC voltages each having the amplitude, which is normalized so that its peak is set to 1, changes along the curve of the amplitude compensation coefficient K illustrated in the lower side of FIG. 7. This results in the sound-pressure level becoming flat across the resonance rotational speed as illustrated in the upper side of FIG. 7 by the solid line. That is, the first embodiment reduces the noise level, and reduces change of the noise level caused by variations of the rotational speed of the rotor 14.

Figure 8:
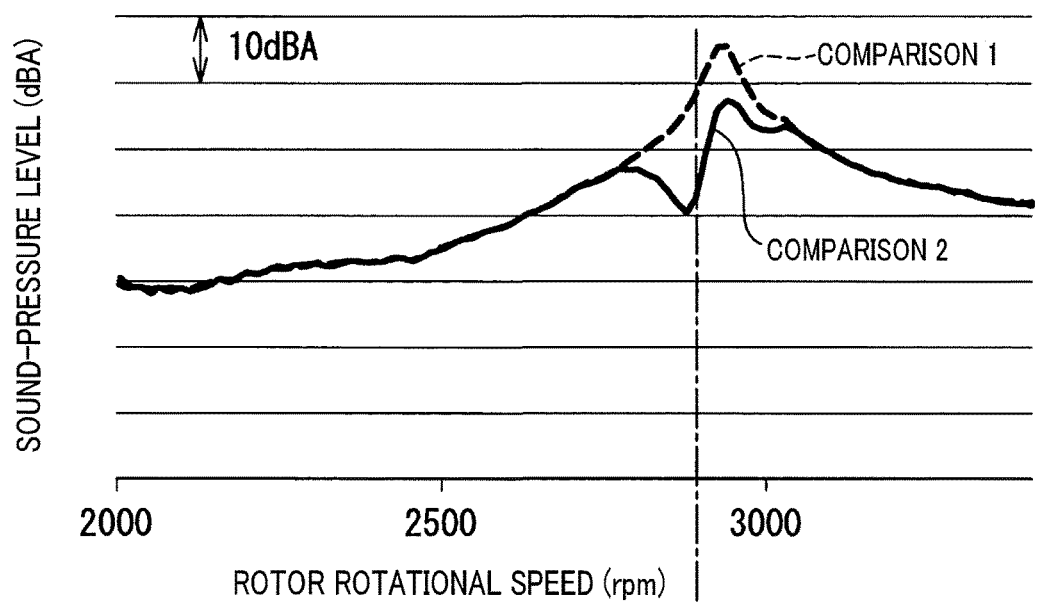
FIG. 8 is graphs schematically illustrating an advantageous effect of noise reduction achieved by a second comparison example.
Figure 8:
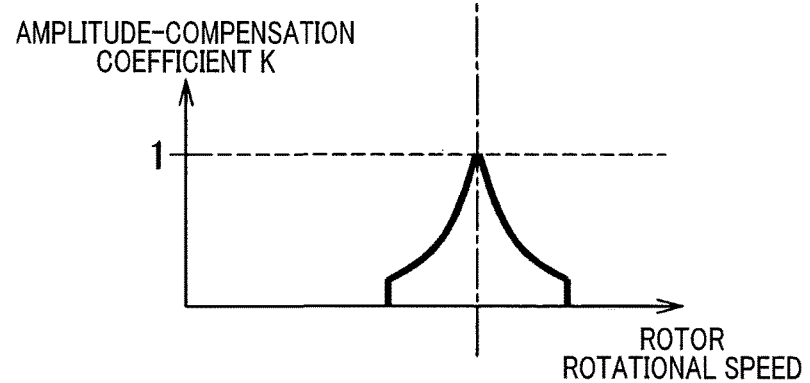

The upper side of FIG. 8 schematically illustrates, by the solid line, a second comparison example (comparison example 2) with respect to the first embodiment. The comparison example 2 shows, as a graph, how the sound-pressure level of noise at the 50th rotation order changes with change of the rotational speed of the rotor 14 with superimposition of harmonic AC voltages on the respective fundamental AC voltages. At that time, the comparison example 2 uses the harmonic AC voltages each having the amplitude deter mined based on the resting vibration property independent of the deformation of the rotating rotor 14.

In the comparison example 2, it is determined that the natural vibration property of the resting rotor 14, i.e. non-rotating rotor, 14, has a peak sound-pressure level at approximately 2890 rpm of the rotational speed of the rotor 14. The comparison example 2 superimposes, on the respective fundamental AC voltages, the harmonic AC voltages, each of which has the amplitude normalized to have a peak of 1 and changes along the curve of the amplitude compensation coefficient K illustrated in the lower side of FIG. 8. This results in the sound-pressure level widely changing across the resonance rotational speed, in other words, changing to have a peak and a valley, as illustrated in the upper side of FIG. 8 by the solid line. That is, the second comparison example does not sufficiently reduce the peak of the sound-pressure level, and also results in the noise level widely changing caused by variations of the rotational speed of the rotor 14.

In contrast, as described above, the first embodiment prevents the occurrence of the above problems resulted from the comparison example 2.

The present disclosure is not limited to the first embodiment, and can be freely modified within the scope of the present disclosure.

The rotor 14 according to the first embodiment is comprised of the ten permanent magnets 14a, and is designed as a symmetric rotor such that each permanent magnet 14a is symmetrically located with respect to the opposing one of the permanent magnets 14a across the axial direction of the rotor 14. This configuration results in the rotating vibration property of the rotor 14 changing with respect to the resting vibration property of the rotor 14 such that the accelerance peak of the rotating vibration property is shifted to the higher frequency side relative to the accelerance peak of the resting vibration property. However, the technologies described in the present disclosure are effective for asymmetrically designed rotors.

Figure 9:
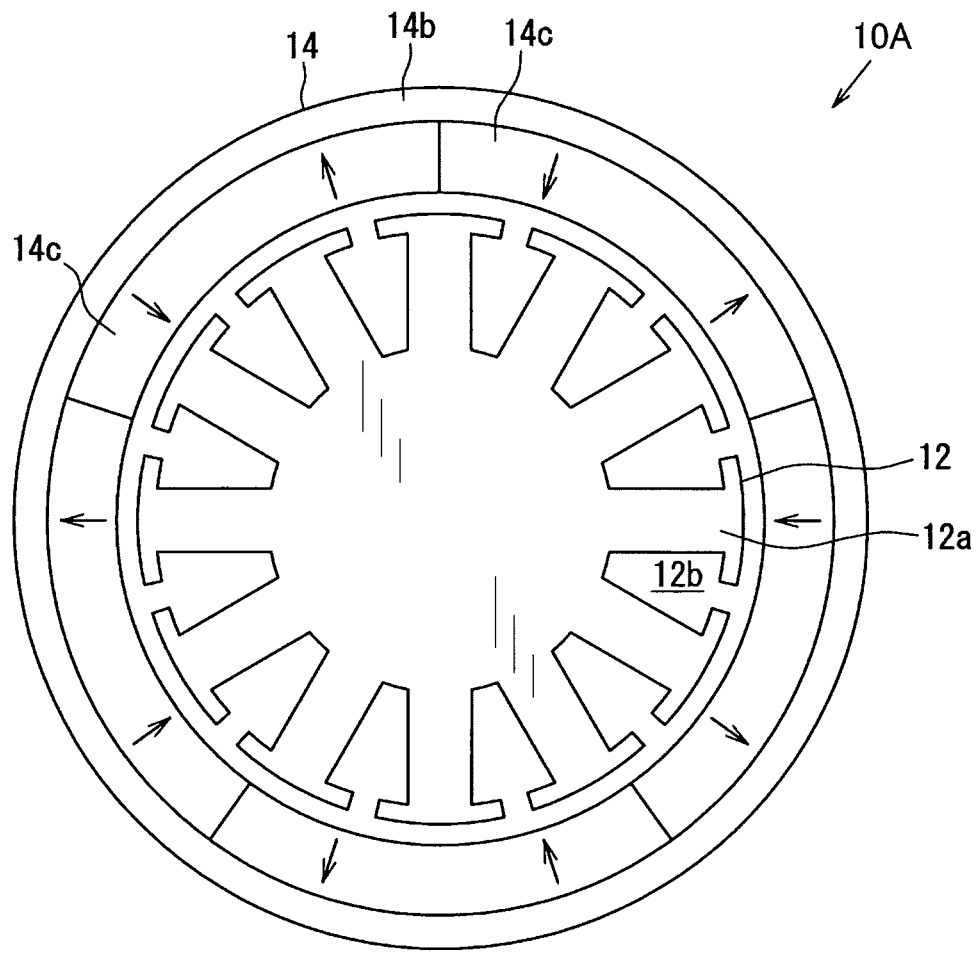
FIG. 9 is a cross sectional view taken on a plane perpendicular to the axial direction of a motor according to the second embodiment of the present disclosure.

FIG. 9 schematically illustrates an outer-rotor motor 10A including such an asymmetrically designed rotor 14A according to the second embodiment of the present disclosure.

Referring to FIG. 9, the rotor 14A, which has a hollow cylindrical shape, is comprised of five permanent magnets 14c having the same shape, and the back yoke 14b. That is, any pair of permanent magnets 14c are not symmetrically arranged with respect to each other across the axial direction of the rotor 14A.

The asymmetrically designed rotor 14A causes stress due to centrifugal force to non-uniformly act thereto while the rotor 14A is turning. For this reason, the rotating vibration property of the rotor 14A changes with respect to the resting vibration property of the rotor 14A such that the rotating vibration property of the rotor 14A has two accelerance peak that are respectively shifted to the higher frequency side and lower frequency side relative to the accelerance peak of the resting vibration property.

Figure 10:
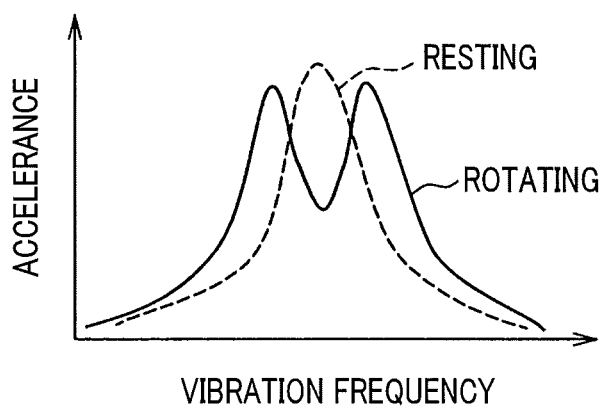
FIG. 10 is a graph schematically illustrating a rotating vibration property of a rotor of the motor while the rotor is rotating and a resting vibration property of the rotor while the rotor is at rest according to the second embodiment.
Figure 11:
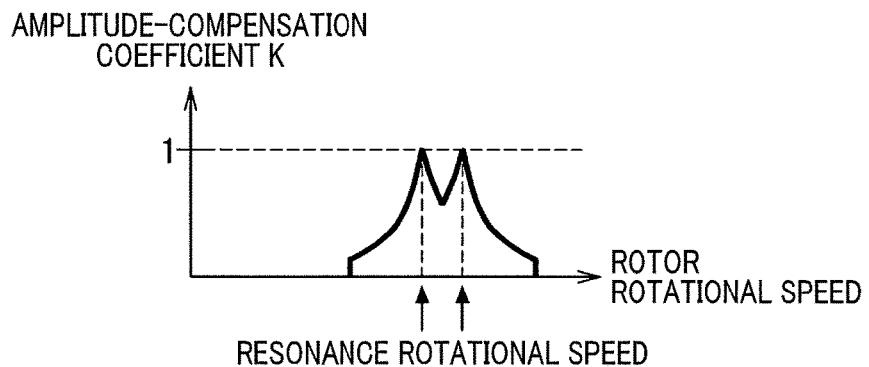
FIG. 11 is a graph schematically illustrating an amplitude-compensation coefficient property according to the second embodiment.

Specifically, the accelerance vibration property illustrated in FIG. 10 has the two accelerance peaks, each of which corresponds to a resonance rotational speed (rpm) of the rotor 14 at a predetermined rotation order.

That is, the inventors of the present disclosure have determined that the above phenomenon occurs when the asymmetrically designed rotor 14A is used.

In view of the phenomenon, the harmonic amplitude adjuster 55C according to the second embodiment reduces the amplitude of each of the harmonic AC voltages such that the reduction of the amplitude reflects the change of the accelerance of the rotor 14; this change of the accelerance of the rotor 14 depends on variations of the rotational speed of the rotor 14 without superimposition of the harmonic AC voltages on the respective fundamental AC voltages.

Specifically, the harmonic amplitude adjuster 55C according to the second embodiment determines an amplitude compensation coefficient K, which is used to be multiplied to the amplitude of each of the harmonic AC voltage commands, such that the change curve of the amplitude compensation coefficient K is substantially similar to the change curve of the accelerance vibration property illustrated in FIG. 10.

This configuration enables harmonic AC currents based on the harmonic AC voltages, which are effective in reduction of rotor vibrations, to efficiently flow through the stator coils of the motor 10 when the rotational speed of the rotor 14 varies across the resonance rotational speed. This further reliably reduces variations of motor noise level.

The harmonic amplitude adjuster 55C according to the first embodiment gradually reduces the amplitude of each of the harmonic AC voltage commands as the actual rotational speed of the rotor 14 deviates from the resonance rotational speed. This gradual reduction of the amplitude of each of the harmonic AC voltage commands reflects the change of the accelerance vibration property, which is obtained without using harmonic AC voltages. In other words, the harmonic amplitude adjuster 55C according to the first embodiment uses the change curve of the amplitude compensation coefficient K to adjust the amplitude of each of the harmonic AC voltages. The change curve of the amplitude compensation coefficient K is substantially similar to the change curve of the accelerance vibration property obtained without superimposition of the harmonic AC voltages on the respective fundamental AC voltages. The present disclosure is however not limited to the configuration.

Figure 12:
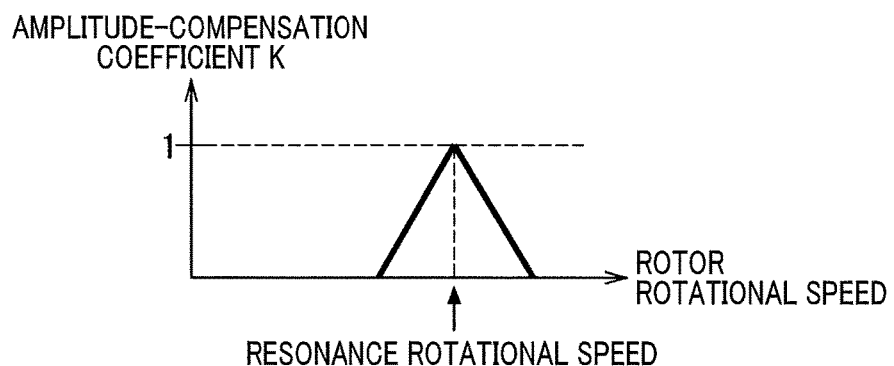
FIG. 12 is a graph schematically illustrating an amplitude-compensation coefficient property according to a modification of the first embodiment.

Specifically, the harmonic amplitude adjuster 55C according the present disclosure can be configured to freely reduce the amplitude of each of the harmonic AC voltages as the rotational speed of the rotor 14 deviates from the resonance rotational speed. For example, the harmonic amplitude adjuster 55C can be configured to use the amplitude compensation coefficient K that linearly decreases as the rotational speed of the rotor 14 deviates from the resonance rotational speed as illustrated in FIG. 12.

Figure 13:
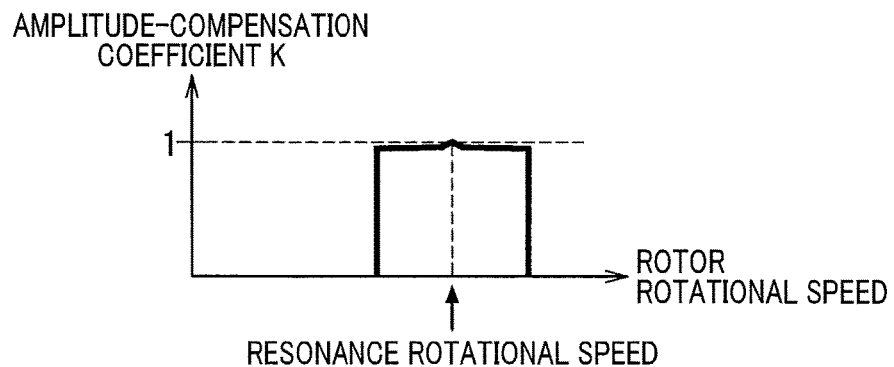
FIG. 13 is a graph schematically illustrating an amplitude-compensation coefficient property according to another modification of the first embodiment.

The harmonic amplitude adjuster 55C according to the present disclosure can reduce the amplitude of each of the harmonic AC voltages when the rotational speed of the rotor 14 is in disagreement with the resonance rotational speed to be smaller than the amplitude of each of the harmonic AC voltages when the rotational speed of the rotor 14 is in agreement with the resonance rotational speed (see FIG. 13).

The harmonic amplitude adjuster 55C according to the first embodiment reduces the amplitude of each of the harmonic AC voltages when the rotational speed of the rotor 14 is in agreement with the resonance rotational speed to be smaller than the amplitude of each of the harmonic AC voltages when the rotational speed of the rotor 14 is in disagreement with the resonance rotational speed. The present disclosure is however not limited to the configuration.

Figure 14:
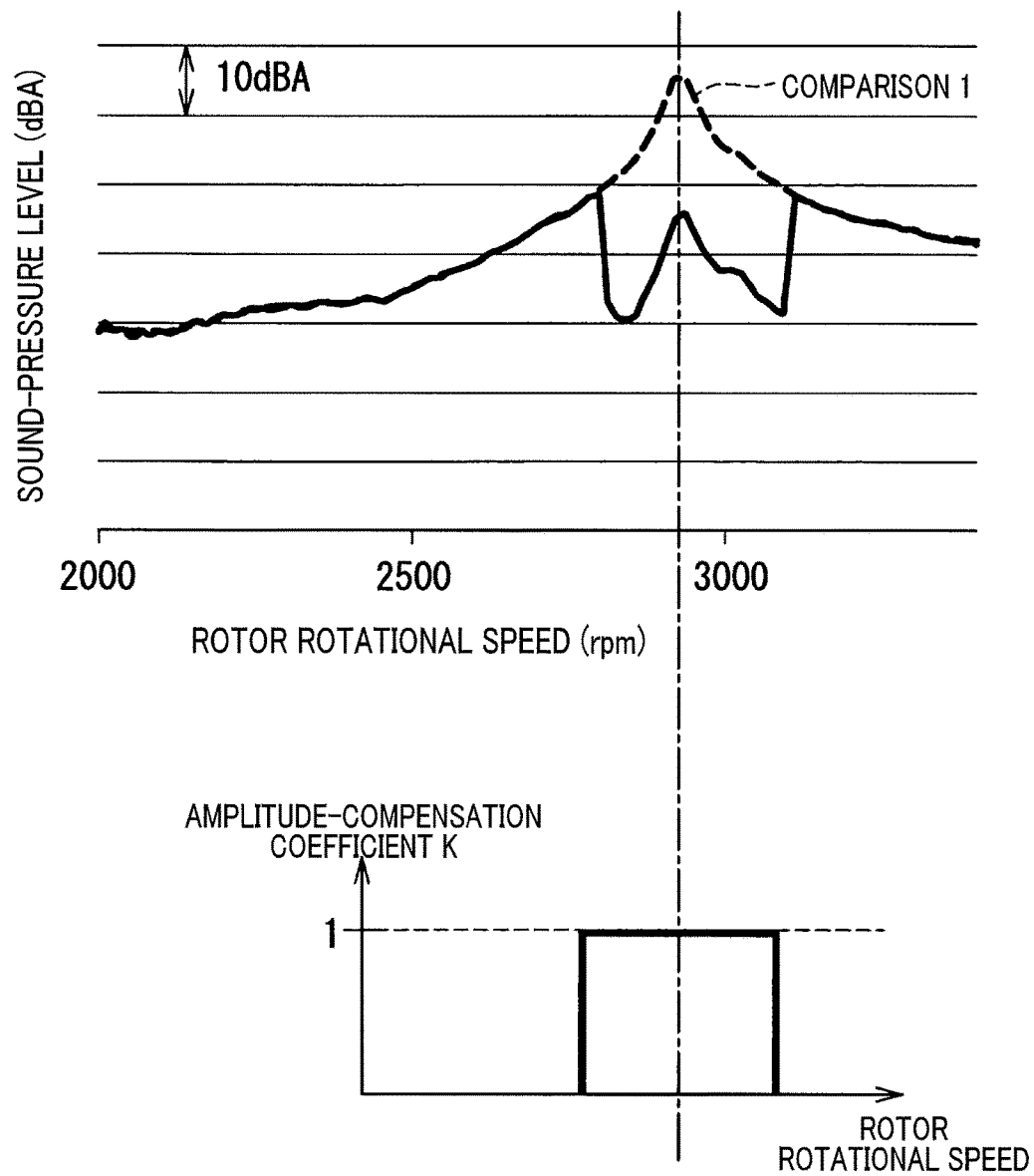
FIG. 14 is graphs schematically illustrating an advantageous effect of noise reduction achieved by a motor control apparatus according to a further modification of the first embodiment.

Specifically, the harmonic amplitude adjuster 55C according to the present disclosure can maintain the amplitude of each of the harmonic AC voltages to be constant within the superimposition rotational-speed range as illustrated in the lower side of FIG. 14. This configuration enables motor noise generated due to rotor vibrations when the rotor 14 is rotating to be reliably reduced.

Each of the first and second embodiments and their modifications set forth above is configured such that the amplitude compensation coefficient K is set to be equal to or lower than 1, but the present disclosure is not limited thereto. Specifically, each of the first and second embodiments and their modifications set forth above can be configured such that the amplitude compensation coefficient K is set to be higher than 1, or set to be lower than 1. The harmonic amplitude adjuster 55C according to the present disclosure can change the phase of each of the harmonic AC voltages while maintaining the amplitude of each of the harmonic AC voltages to be constant within the superimposition rotational-speed range.

The motor 10 according to the first embodiment is designed as an outer-rotor motor, but the present disclosure is not limited thereto.

Figure 15:
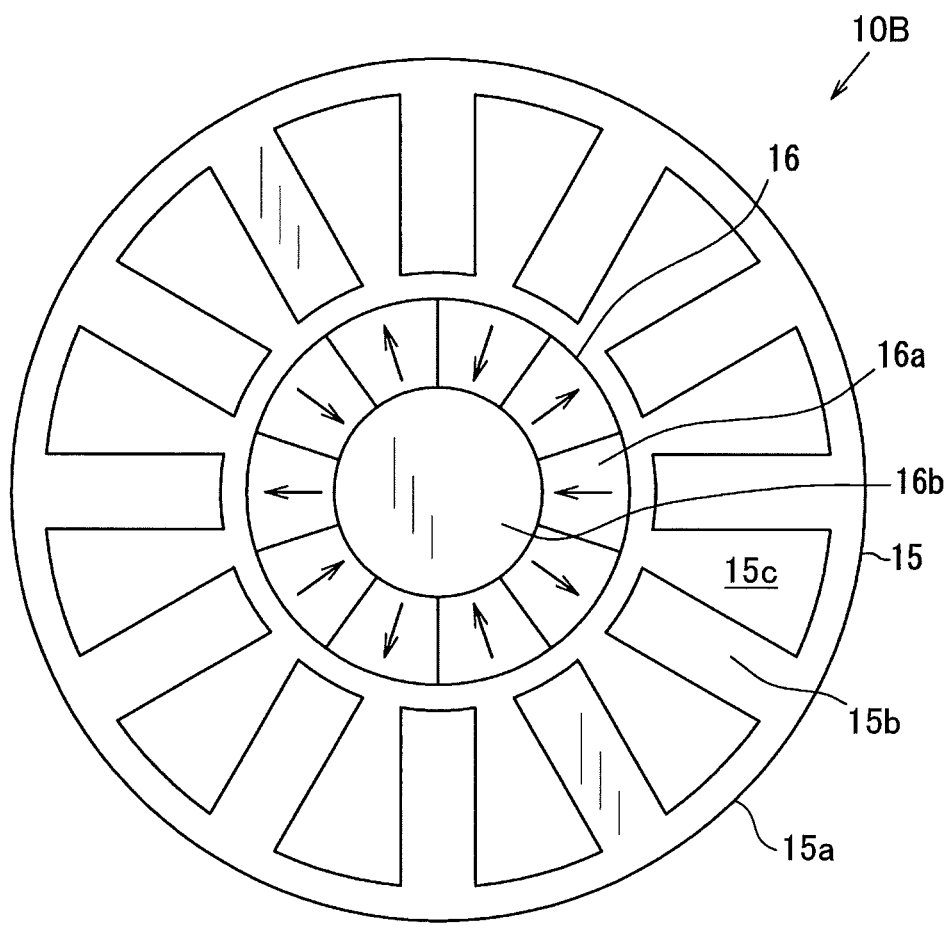
FIG. 15 is a cross sectional view taken on a plane perpendicular to the axial direction of a motor according to the third embodiment of the present disclosure.

Specifically, FIG. 15 is a cross sectional view taken on a plane perpendicular to the axial direction of an inner-rotor motor 10B according to the third embodiment of the present disclosure. In FIG. 15, hatching is omitted in order to clearly illustrate the cross section of the motor 10B.

The motor 10B illustrated in FIG. 15 includes a stator 15 and a rotor 16 arranged to be rotatable with respect to the stator 15. The stator 15 has a hollow cylindrical shape, i.e. an annular shape. The stator 15 is arranged to surround the rotor 16 with an air gap between the outer periphery of the rotor 16 and the inner periphery of each of teeth 15a of the stator 15 described later. In other words, the rotor 16 is disposed in the stator 15 at the radially inside of the stator 15.

The rotor 16 is comprised of a plurality of permanent magnets 16a, and a cylindrical rotor core 16b arranged to join the permanent magnets 16a such that the joined permanent magnets 16a have an annular shape.

For example, the rotor 16 according to the third embodiment includes ten permanent magnets 16a having the same shape. Each of the permanent magnets 16a serves as a magnetic pole. That is, each of the permanent magnets 16a has a magnetic pole extending radially outward from the rotor core 16b. The polarities of the permanent magnets 16a arranged in the circumferential direction of the rotor 16 alternately change. Specifically, N- and S-pole permanent magnets 16a are alternately arranged in the circumferential direction of the rotor 16. Referring to FIG. 15, the arrow described in a permanent magnet 16a and oriented outward represents an N pole, and the arrow described in another permanent magnet 16a and oriented inward represents an S pole.

The stator 15 is comprised of a hollow cylindrical stator core 15a and a plurality of, for example, twelve teeth 15b each continuously projecting radially inward from the inner periphery of the stator core 15a. The teeth 15b are arranged in the circumferential direction of the stator core 15a at regular pitches via slots 15c. That is, each of the teeth 15b faces the outer periphery of the rotor 16 with an air gap therebetween.

Figure 16:
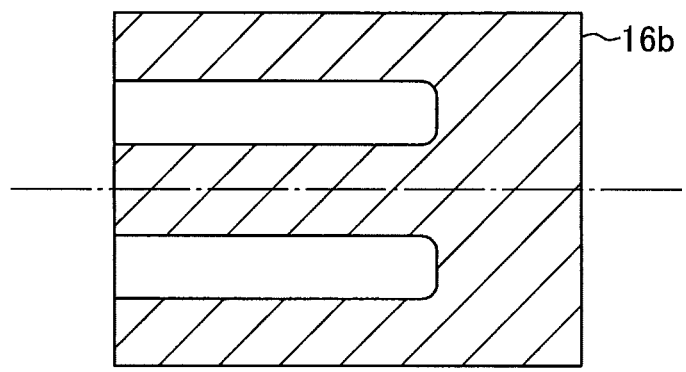
FIG. 16 is a cross sectional view of a rotor core of the motor illustrated in FIG. 15 taken on a plane that passes through the rotation axis of the rotor according to the third embodiment.

Referring to FIG. 16, the rotor core 16b of the rotor 10 has for example an annular bottomed hole coaxial to the center axis thereof for reducing inertial moment. That is, FIG. 16 is a cross sectional view of the rotor core 16b taken on a plane that passes through the rotation axis of the rotor 16, i.e. center axis of the rotor core 16b. In FIG. 16, a dot-and-chain line represents the rotation axis of the motor 16.

The control apparatus 50 and motor control system 100 are effective in being applied to the inner-rotor motor 10B.

The motor 10B illustrated in FIGS. 15 and 16 is configured such that the rotor core 16b has at least partially hollow portion therein. This may cause the rotor 16 to be likely distorted due to centrifugal force when the rotor 16 is rotating.

In view of this phenomenon, the superimposition command generator 55 is configured to generate, for each phase of the motor 10, the harmonic AC voltage command using the rotating vibration property that represents the natural vibration property of the rotor 16 while the rotor 16 is rotating. This configuration therefore reliably reduces motor noise caused by vibrations of the rotating hollow rotor 16.

Of course, the shape of the rotor core 16b, i.e. the rotor 16, according to the third embodiment is not limited to the partially hollow cylindrical shape. That is, the rotor core 16b can have a solid cylindrical shape.

The control apparatus 50 and motor control system 100 according to each of the first to third embodiments and their modifications are configured to reduce noise at the 50th rotation order, but the present disclosure is not limited thereto. Specifically, the control apparatus 50 and motor control system 100 according to each of the first to third embodiments and their modifications can be configured to reduce noise at a selected m-th rotation order; m is a positive integer set to be greater than 2 and different from 50.

The motor 10 is designed to have five pole-pairs and twelve slots, but the present disclosure is not limited thereto. Specifically, the control apparatus 50 and motor control system 100 according to each of the first to third embodiments and their modifications can be effective in motors each having a predetermined number of pole pairs and a predetermined number of slots, which are different from the five pole pairs and the twelve slots.

The motor 10 is a three-phase motor, but the control apparatus 50 and motor control system 100 according to the first to third embodiments and their modifications can be applied to multiphase motors whose number of phases is set to be higher than three phases. The motor 10 is designed as a permanent magnet synchronous motor, but can be designed as another motor, such as a wound-field synchronous motor including a field winding in the rotor.

The motor 10 includes the rotational position sensor 16, and the rotor position detector 52 detects the rotational position of the rotor 14 based on the measurement signal sent from the rotor position sensor 52, but the present disclosure is not limited thereto. Specifically, the motor 10 can include no rotational position sensors, and the rotor position detector 52 can calculate the rotational position of the rotor 14 based on one or more electrical parameters associated with the rotational position of the rotor 14, such as the phase of at least one of the three-phase currents flowing through the respective connection lines 25. In other words, the control apparatus 50 and motor control system 100 according to the first to third embodiments and their modifications can be configured to perform sensor-less control of the motor 10.

The control apparatus 50 and motor control system 100 according to the first to third embodiments and their modifications can be configured to motors for another load other than the fan 19.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A control apparatus for a motor including a stator with a stator coil, and a rotor including a rotor magnetic field, in which an AC voltage based on a target rotational speed is input to the stator coil as a fundamental voltage, so that magnetic interactions between a stator magnetic field generated by the stator coil and the rotor magnetic field rotate the rotor, the control apparatus comprising:
    a fundamental voltage generator configured to generate, based on the target rotational speed, a fundamental voltage command for the fundamental voltage;
    a property storage configured to store a natural vibration property of the rotor when the rotor is rotating as a rotating vibration property;
    a rotating state detector configured to detect a rotating position and a rotational speed of the rotor as a rotating state of the rotor; and
    a harmonic voltage generator configured to generate, based on the rotating state of the rotor and the rotating vibration property, a harmonic voltage command to be superimposed on the fundamental voltage command generated by the fundamental voltage generator.

2. The control apparatus according to claim 1, wherein:
the property storage stores, as the rotating vibration property, information including:
    a resting vibration property that represents a natural vibration property when the rotor is at rest; and
    a correction functional formula that corrects the resting vibration property to the rotating vibration property.

3. The control apparatus according to claim 1, wherein the harmonic voltage generator comprises:
    a resonance property calculator configured to:
        multiply, by a predetermined rotation order, the rotational speed of the rotor to thereby calculate a product of the predetermined rotation order and the rotational speed of the rotor; and
        calculate, based on the rotating vibration property and the calculated product, a value of the rotating vibration property corresponding to a resonance rotational speed at the predetermined rotation order as a resonance characteristic value; and
    a harmonic voltage determiner configured to determine, based on the resonance characteristic value and the rotating state of the rotor, a frequency, an amplitude, and a phase of the harmonic voltage command.

4. The control apparatus according to claim 1, wherein:
the rotating vibration property is a first rotating vibration property based on a vibration frequency of the rotor; and
the harmonic voltage determiner comprises an amplitude determiner configured to determine the amplitude of the harmonic voltage command,
the amplitude determiner being configured to:
    convert the first rotating vibration property into a second rotating vibration property based on the predetermined rotation order;
    obtain, as the resonance characteristic value, a peak of the second rotating vibration property, the peak corresponding to the resonance rotational speed; and
    reduce the amplitude of the harmonic voltage command when the rotational value of the rotor is in disagreement with the resonance rotational speed to be smaller than the amplitude of the harmonic voltage command when the rotational value of the rotor is in agreement with the resonance rotational speed.

5. The control apparatus according to claim 4, wherein:
the amplitude determiner is configured to reduce the amplitude of the harmonic voltage command as the rotational speed of the rotor deviates from the resonance rotational speed.

6. The control apparatus according to claim 5, wherein:
the amplitude deter miner is configured to reduce, based on change of the second rotating vibration property relative to the resonance rotational speed, the amplitude of the harmonic voltage command as the rotational speed of the rotor deviates from the resonance rotational speed.

7. The control apparatus according to claim 1, wherein:
the rotor includes at least partially hollow portion therein.

8. The control apparatus according to claim 7, wherein:
the rotor has a hollow cylindrical shape; and
the stator is disposed in a hollow portion of the rotor.

* * * * *